United States Patent
Yu et al.

(10) Patent No.: US 8,774,177 B2
(45) Date of Patent: Jul. 8, 2014

(54) CLASSIFYING TRAFFIC AT A NETWORK NODE USING MULTIPLE ON-CHIP MEMORY ARRAYS

(75) Inventors: James Yu, San Jose, CA (US); Mike Morrison, Sunnyvale, CA (US)

(73) Assignee: Alcatel Lucent, Paris (FR)

( * ) Notice: Subject to any disclaimer, the term of this patent is extended or adjusted under 35 U.S.C. 154(b) by 2643 days.

(21) Appl. No.: 10/197,747

(22) Filed: Jul. 17, 2002

(65) Prior Publication Data

US 2003/0223423 A1   Dec. 4, 2003

Related U.S. Application Data

(60) Provisional application No. 60/386,000, filed on Jun. 4, 2002.

(51) Int. Cl.
*H04L 12/28* (2006.01)

(52) U.S. Cl.
USPC .............................. 370/389; 370/392; 370/394

(58) Field of Classification Search
USPC .................. 370/389, 392; 709/213, 214, 215; 711/100, 108, 153, 169
See application file for complete search history.

(56) References Cited

U.S. PATENT DOCUMENTS

| | | | |
|---|---|---|---|
| 5,854,760 A | | 12/1998 | Ikenaga et al. |
| 5,920,886 A | * | 7/1999 | Feldmeier ..................... 711/108 |
| 6,115,378 A | * | 9/2000 | Hendel et al. ................. 370/392 |
| 6,157,644 A | * | 12/2000 | Bernstein et al. ............. 370/392 |
| 6,374,326 B1 | * | 4/2002 | Kansal et al. ................. 711/108 |
| 6,650,640 B1 | | 11/2003 | Muller et al. |
| 6,757,249 B1 | * | 6/2004 | Kejriwal et al. ........... 370/235.1 |
| 6,839,703 B2 | * | 1/2005 | Jinzaki ............................. 707/3 |
| 6,853,640 B1 | * | 2/2005 | Hayashi et al. ............... 370/392 |
| 6,981,110 B1 | * | 12/2005 | Melvin ......................... 711/154 |
| 6,985,483 B2 | * | 1/2006 | Mehrotra et al. ............. 370/389 |
| 7,124,200 B2 | * | 10/2006 | Sato et al. ..................... 709/239 |
| 7,167,471 B2 | * | 1/2007 | Calvignac et al. ............ 370/389 |
| 7,245,623 B1 | * | 7/2007 | Cheriton ....................... 370/393 |
| 7,266,117 B1 | * | 9/2007 | Davis ............................ 370/363 |
| 7,475,200 B1 | * | 1/2009 | Melvin ......................... 711/154 |
| 2001/0007560 A1 | | 7/2001 | Masuda et al. |
| 2002/0023080 A1 | | 2/2002 | Uga et al. |
| 2002/0038379 A1 | * | 3/2002 | Sato et al. ..................... 709/238 |
| 2002/0126672 A1 | * | 9/2002 | Chow et al. ................... 370/392 |

\* cited by examiner

*Primary Examiner* — Brian O'Connor
(74) *Attorney, Agent, or Firm* — Wilson Ham & Holman

(57) ABSTRACT

A technique for classifying traffic at a network node includes programming multiple on-chip memory arrays with identical search entries, receiving multiple packets, and distributing classification searches related to the packets among the multiple on-chip memory arrays. In an embodiment, the on-chip memory arrays are content-addressable memory (CAM) arrays. In another embodiment, the distributing of classification searches related to the packets is performed in an alternating fashion with respect to a fixed order.

15 Claims, 17 Drawing Sheets

| Select | Port | Priority | Offset 0 | Length 0 | ••• | Offset M-1 | Length M-1 |

FIG. 7A

| Field Name | Bits | Description |
|---|---|---|
| Select | 2 | Select a traffic distribution algorithm<br>- Round robin<br>- Least utilized<br>- Fixed port number<br>- Hash using offset-length pairs |
| Port | 2 | Port number to direct packet if select = fixed |
| Priority | 1 | High/Low priority threshold |
| Offset 0 | 6 | Starting byte for field 0 used in hashing |
| Length 0 | 6 | Length for field 0 used in hashing |
| ••• | | |
| Offset M-1 | 6 | Starting byte for field M-1 used in hashing |
| Length M-1 | 6 | Length for field M-1 used in hashing |

FIG. 7B

| Cycles | CAM array A | CAM array B |
|---|---|---|
| 0 | Key 0 start search | |
| 1 | Key 0 end search | Key 1 start search |
| 2 | Key 2 start search | Key 1 end search |
| 3 | Key 2 end search | Key 3 start search |
| 4 | Key 4 start search | Key 3 end search |
| 5 | Key 4 end search | Key 5 start search |
| ⋮ | | |
| 2N | Key 2N start search | Key 2N-1 end search |
| 2N+1 | Key 2N end search | Key 2N+1 start search |
| ⋮ | | |

FIG. 14

CLASSIFYING TRAFFIC AT A NETWORK NODE USING MULTIPLE ON-CHIP MEMORY ARRAYS

CROSS REFERENCE TO RELATED APPLICATION

This application is entitled to the benefit of provisional Patent Application Ser. No. 60/386,000, filed Jun. 4, 2002.

FIELD OF THE INVENTION

The invention relates to classifying traffic at a network node, and more particularly to classifying traffic at a network node using on-chip memory.

BACKGROUND OF THE INVENTION

FIG. 1 depicts a prior art technique for using a content addressable memory (CAM) array to support traffic forwarding at a network node. In an embodiment, the technique depicted in FIG. 1 implements a routing look-up. In an embodiment, a portion or field of an incoming packet is parsed out of the packet header and is then used as a key (CAM key) to search the CAM array. The CAM array is searched in parallel for a match to the key and when a match is found in the CAM array, data that is associated with the matching entry in the CAM array (associated data) is provided as an output. Typically, the associated data is used in determining the next hop of the packet. In the example of FIG. 1, the Internet Protocol destination address (dst IP) is parsed from the incoming packet and used as the key to be fed into the CAM array. When a match is found in the CAM array, an outgoing port number is output as the associated data, thereby determining the next hop of the packet.

CAM arrays are also utilized in the implementation of Access Control List (ACL) and QOS (Quality of Service) applications. In such applications, multiple fields are often parsed out of a packet header and used as a CAM key. In ACL applications, the associated data provides a deny or permit decision on forwarding a packet. In QOS applications, the associated data provides a rule on how to prioritize a packet.

Using a CAM array within a network node to support traffic forwarding provides several advantages over the use of random access memory (RAM). These advantages include, firstly, a CAM array can be searched in parallel, thereby providing faster and more efficient searching than RAM, which must be searched in series. Secondly, bits in a CAM array can be masked so that matches can be made between a key and a CAM array entry regardless of what data is located within the key at the bit locations corresponding to the masked bit space.

Despite the advantages of using a CAM array, using a CAM array to support traffic forwarding remains problematic because of the fact that specific fields must be parsed out of incoming packets for use in searching the CAM array. The parsing of specific fields in a packet requires knowledge of the packet format (that is, the protocols under which the packet was formatted). Knowledge of packet formats is obtained by processing the header fields of incoming packets. The parsing of specific fields of packet headers consumes valuable processing resources and is time intensive.

FIG. 11 depicts a prior art technique for classifying traffic at a network node. In the prior art technique, a single CAM array is searched in series with keys related to incoming packets to classify incoming packets. The technique depicted in FIG. 11 includes incoming packets 0-3, comparand unit 1110, CAM array 1120, and clock 1130. In an embodiment, the packets 0-3 are in a fixed order, with packet 0 being the first to be classified and packet 3 being the last to be classified. In an embodiment, a key is parsed out of an incoming packet, i.e., packet 0. The key is input to the comparand unit, which generates a comparand value that corresponds to the key. The comparand value is compared against all of the entries in the CAM array. Each comparison results in the classification of one packet. In an embodiment, the comparison of the comparand value against the entries in the CAM array takes more than one clock cycle. For example, in the depiction of FIG. 11, each comparison requires an average of two (2) clock cycles to be completed, as indicated by the clock 1130. Using this technique, completing the four classification operations takes eight clock cycles.

Memory interleaving is an example of a prior art implementation in which multiple memory devices are searched in real time. In the implementation of memory interleaving, memory accesses are divided among multiple memory arrays ("N" memory arrays). However, each of the N memory arrays contains only a fraction (1/N) of the entries that a single memory array would contain if only one memory array was used. Thus, the entries in each of the N memory arrays are different from one another. In prior art memory interleaving, for every N memory accesses, each access must target a different one of the N memory arrays. If any two accesses in the N accesses target the same array, a "collision" results in which one of the two accesses stalls until the first access is complete. As a result of the collision, the overall throughput achieved from memory interleaving is reduced.

In view of the limitations of the prior art, what is needed is a technique for classifying traffic that makes efficient use of each clock cycle.

SUMMARY OF THE INVENTION

A technique for classifying traffic at a network node includes programming multiple on-chip memory arrays with identical search entries, receiving multiple packets, and distributing classification searches related to the packets among the multiple on-chip memory arrays. In an embodiment, the on-chip memory arrays are content-addressable memory (CAM) arrays.

In an embodiment, the multiple packets have a fixed order prior to the distributing of classification searches related to the packets, and the distributing of classification searches related to the packets is performed according to the fixed order. In another embodiment, the distributing of classification searches related to the packets is performed in an alternating fashion with respect to said fixed order. In yet another embodiment, the distributing of classification searches related to the packets alternates at each clock cycle. By alternating the classification searches between two identically programmed memory arrays at each clock cycle, a consistent search rate of one search per clock cycle can be achieved.

In an embodiment, the on-chip memory arrays are CAM arrays, the search entries are class-specific entries, each having an associated traffic class, and the method further includes obtaining a protocol-independent key field from a packet and searching the multiple programmed CAM arrays with the protocol-independent key field to identify an associated traffic class of the packet.

In another embodiment, the on-chip memory arrays are CAM arrays, the search entries are class-specific entries, each having an associated traffic distribution policy, and the method further includes obtaining a protocol-independent key field from a packet, searching the multiple programmed CAM arrays with the protocol-independent key field to identify an associated traffic distribution policy for the packet, and applying the identified traffic distribution policy to the packet.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 7A depicts an example traffic distribution policy entry.

FIG. 7B depicts a table that elaborates on the contents of the information that is included in the fields of the example traffic distribution policy that is depicted in FIG. 7A.

FIG. 14 is a table showing an example of how classification searches are distributed between two CAM arrays as a function of clock cycle, according to an embodiment of the invention.

DETAILED DESCRIPTION OF THE INVENTION

Figure 1:
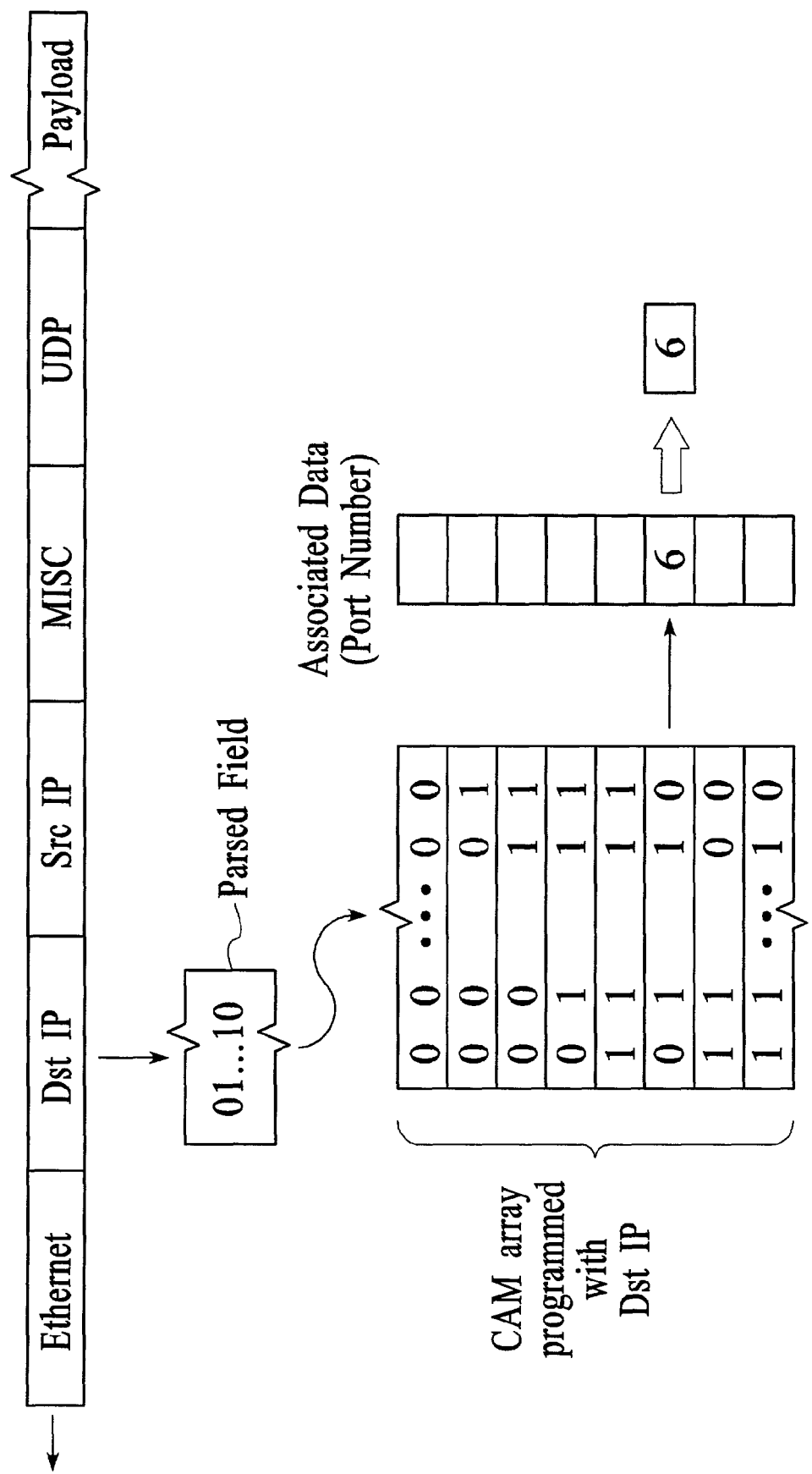
FIG. 1 depicts a prior art technique for using a content addressable memory (CAM) array to support traffic forwarding at a network node.
Figure 2:
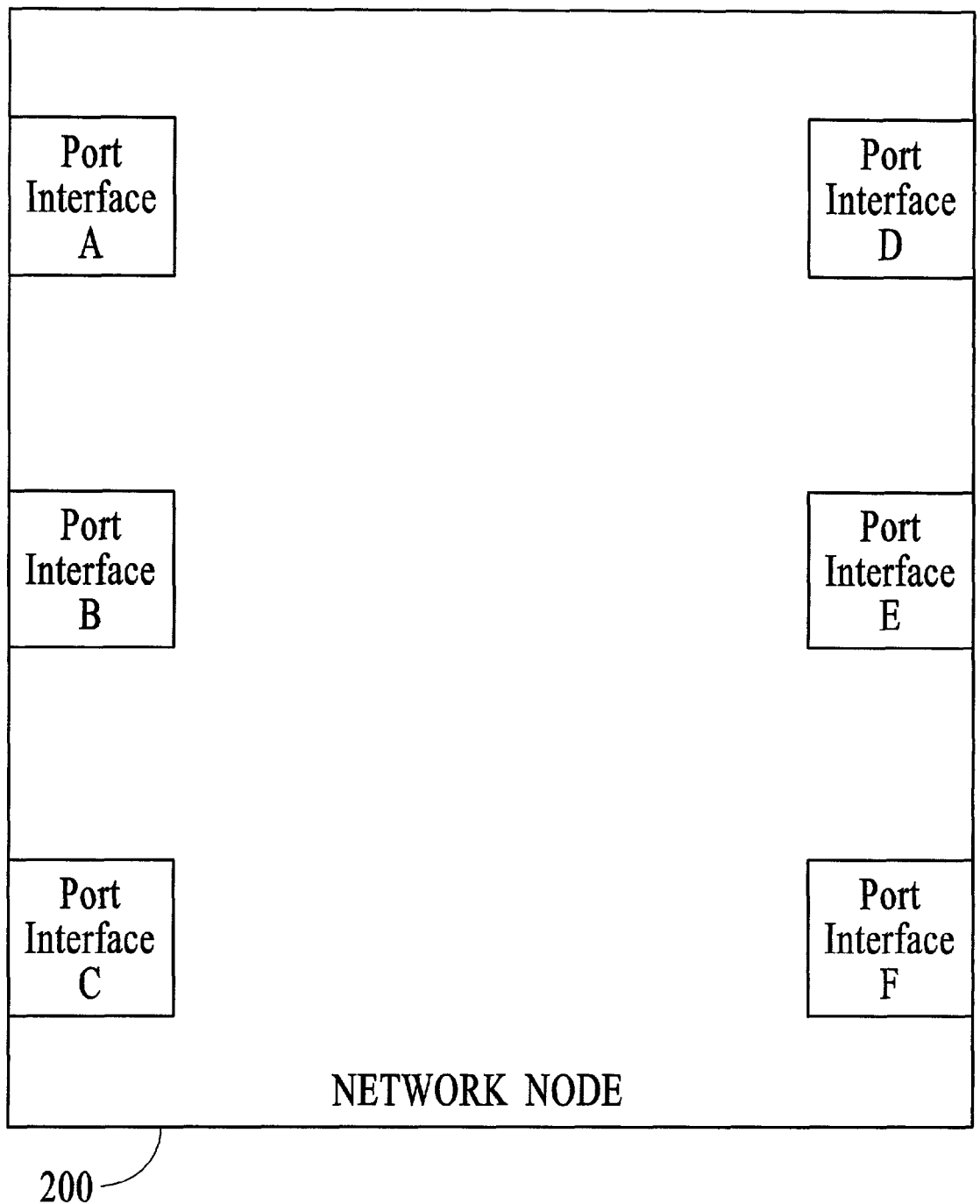
FIG. 2 depicts an example of a network node that is used to classify and distribute network traffic, according to an embodiment of the invention.

FIG. 2 depicts an example of a network node 200 that is used to classify and distribute network traffic, according to an embodiment of the invention. In the embodiment of FIG. 2, the network node is an Ethernet switch/router that forwards traffic within the network node using Layer 2, Layer 3, and/or Layer 4 header information, where the layers are defined by the International Standards Organization (ISO) in the Open System Interconnection (OSI) model. The network node depicted in FIG. 2 includes six port interfaces A-F.

In accordance with an embodiment of the invention, the network node 200 depicted in FIG. 2 includes the functionality to classify and distribute network traffic. In an embodiment, traffic classification and/or distribution occurs at the port interfaces A-F that receive incoming traffic. For example, each port interface can be configured to independently classify and/or distribute network traffic.

Figure 3:
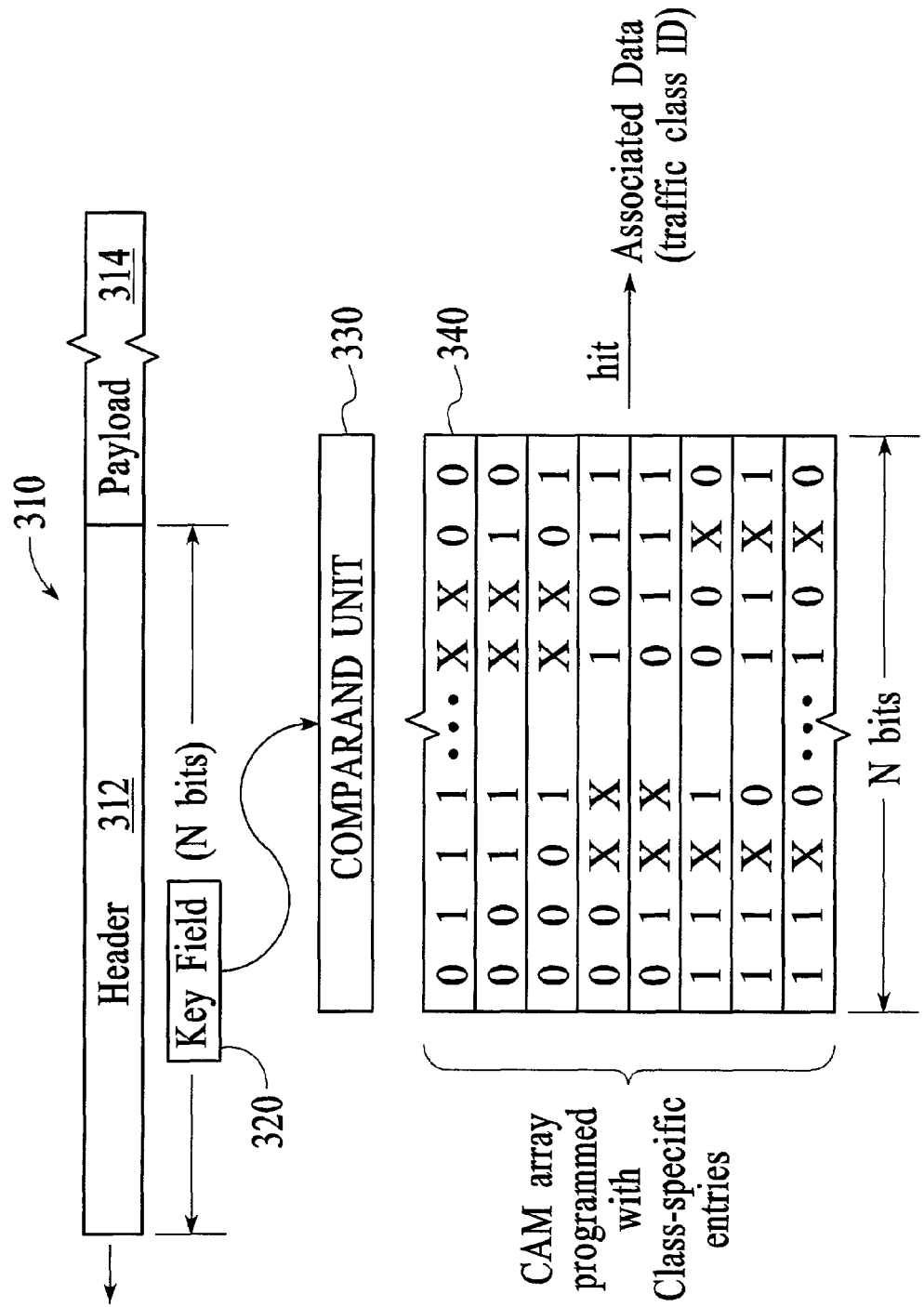
FIG. 3 depicts a technique for classifying traffic at a network node using a content addressable memory (CAM) array in accordance with an embodiment of the invention.

FIG. 3 depicts a technique for classifying traffic at a network node using a content addressable memory (CAM) array in accordance with an embodiment of the invention. The depiction of FIG. 3 includes an incoming packet 310, a key field 320, a comparand unit 330 and a CAM array 340. In the embodiment of FIG. 3, the CAM array is generic, with its contents being described at the bit level.

In an embodiment, the CAM array 340 is programmed with multiple class-specific entries, which correspond to the format of incoming packets and can be used to identify the traffic classes to which the incoming packets belong. The key field 320 is a protocol-independent key field. In an embodiment, the key field is obtained by extracting the key field from an incoming packet. In an embodiment, extracting a key field from an incoming packet involves identifying a continuous portion of the packet.

The key field 320 is extracted from an incoming packet in a protocol-independent fashion by identifying a continuous portion of the incoming packet; either a portion of the incoming packet that begins from bit 0 of the incoming packet or a portion having a standard offset in all incoming packets. The CAM array is searched for a class-specific entry that matches the extracted key field. When a matching class-specific entry is found, associated data which identifies the traffic class of the packet is output.

In an embodiment, the techniques depicted with reference to FIGS. 2-10 are capable of handling multi-layer traffic. In the embodiment depicted in FIG. 3, when traffic enters the network node it is classified based upon the format of the packet. The format of the packet (packet format) includes the particular sequence of headers and payloads, for various layers of traffic, exhibited by the packet. In one embodiment, the packet headers may include information from Layer 2, Layer 3, and/or Layer 4 of the Open System Interconnection (OSI) model as defined by the International Standards Organization (ISO). A packet format is composed of one or more sub-formats or network communication protocols (Protocols). Each Protocol relates to a different layer of traffic. For example, the Protocol of a Layer 2 header could be Ethernet. In the embodiment of FIG. 3, the incoming packet 310 includes a multi-layer header, and a payload. The format of the incoming packet is exemplary only. Other packet formats are contemplated.

In accordance with an embodiment of the invention, the key field 320 is extracted from the incoming packet 310. The key field is a string of bits that is identified from a continuous portion of the incoming packet. Extraction of the key field from the incoming packet is Protocol-independent or packet format-independent. That is, the key field is extracted from each incoming packet without regard for what the format of each incoming packet is. Because the key field is extracted without parsing and without applying knowledge of the Protocol or Protocols in the incoming packet, no Protocol processing is required to accomplish key field extraction. In an embodiment, the key field contains information related to more than one Protocol.

The key field may be identified with bits that start from the beginning of the incoming packet or the key field may be offset by a standard number of bits for all incoming packets. In an embodiment with no offsetting, the first bit of the key field may be the first bit of the incoming packet, i.e., bit zero (0). In the case of offsetting, key fields corresponding to all incoming packets are offset by a standard, predefined number of bits. The calculation of the amount of offset is not made separately for every incoming packet. Rather, the calculation of the amount of offset is made once for the programmed CAM array and then the same offset is applied to all of the incoming packets for the identification of key fields. That is, the same offset is applied blindly to each incoming packet. Offsetting the key field may be desirable under certain circumstances, such as if the lowest layer of all incoming packets has the same Protocol. That is, if the lowest layer of all incoming packets is of the same Protocol and that layer has constant fields in its most significant (first) bits, then the extraction of the key field can be offset by the number of bits that occupy the constant fields. A constant field is a portion of the packet in which the data is the same for all incoming packets. For example, if the lowest layer Protocol is PPP for all incoming packets and the flag, address, and control fields within the PPP Protocol are constant (for example, 0xff03), then the key field can take as its first bit the first bit after the constant field 0xff03. ("0x" type notation indicates that the numbers that follow the "x" are in hexadecimal format.) That is, the extraction of the key field can be offset to exclude the first "Y" bits of the PPP header. When extraction of the key field is offset, the CAM array entries must be programmed to correspond to the data that is included in the key field. By offsetting the extraction of the key field and programming the class-specific entries in the CAM array to correspond the offset field, the key field and the class-specific entries will not contain the non-distinctive data of the constant fields. That is, memory space will not be wasted on bits that do not distinguish one incoming packet from another.

It is not necessary that the key field end at a bit that is at the end of a Protocol field. That is, the key field may end within a given Protocol field. In an embodiment, the key field may include all of the header information of a packet (i.e., Layer 2, Layer 3, and Layer 4 header information). In another embodiment, the key field may include some or all of the highest-level payload. In yet another embodiment, the key field includes only a portion of the header information.

In an embodiment, after the key field is extracted from the incoming packet, it is input into the comparand unit 330. The comparand unit provides a comparand value to the CAM array in order to compare the key field against class-specific entries that are programmed into the CAM array 340. That is, the comparand value corresponds to a particular key field. A class-specific entry is a line programmed into the CAM array composed of bits that are identified with a particular packet format. The class-specific entries are programmed with fields in the same continuous sequence of fields as they exist in an assembled packet. That is, the class-specific entries are programmed with packet fields in their original sequence. The class-specific entries are programmed to correspond to the extracted key fields of particular packets. Therefore, attributes ascribed to key fields, such as that the key field may end within a given Protocol field, can also be ascribed to class-specific entries. In an embodiment, a particular class-specific entry contains fields of more than one Protocol.

In an embodiment, the programmed CAM array is searched in parallel against the key field. In an embodiment, the programmed CAM array is actually searched in parallel against a comparand value which corresponds to the key field. In an embodiment, the entire CAM array is searched in one clock cycle. If a match between the key field and a class-specific entry is identified (i.e., a "hit" occurs), associated data that corresponds to the matching class-specific entry is identified and provided as an output. In the embodiment depicted in FIG. 3, the associated data is a traffic class identifier (traffic class ID). The traffic class ID identifies the traffic class to which the incoming packet belongs.

In an embodiment, there may be multiple matches to the key field among the class-specific entries in the programmed CAM array. In such case, the comparand may be equipped with a mechanism to prioritize the multiple hits, so that only one hit is provided as an output. For example, the mechanism may select only the highest order matching class-specific entry or only the lowest order matching class-specific entry. Alternatively, the mechanism may select the class-specific entry from among the matching class-specific entries at random or in some other way.

In an embodiment, selected bits in the class-specific entries programmed into the CAM array may be masked (i.e., the bits may be made "don't cares"). That is, in the searching of the programmed CAM array, data in the bit locations of the key field that correspond to the masked bit locations in the class-specific entries of the programmed CAM array are regarded as irrelevant. Therefore, a match can be made between the key field and a class-specific entry regardless of what is stored in the bit locations in the key field that correspond to the masked bit locations. In the embodiment of FIG. 3, for example purposes, masked bit locations in the class-specific entries are represented by "X"s.

Figure 4:
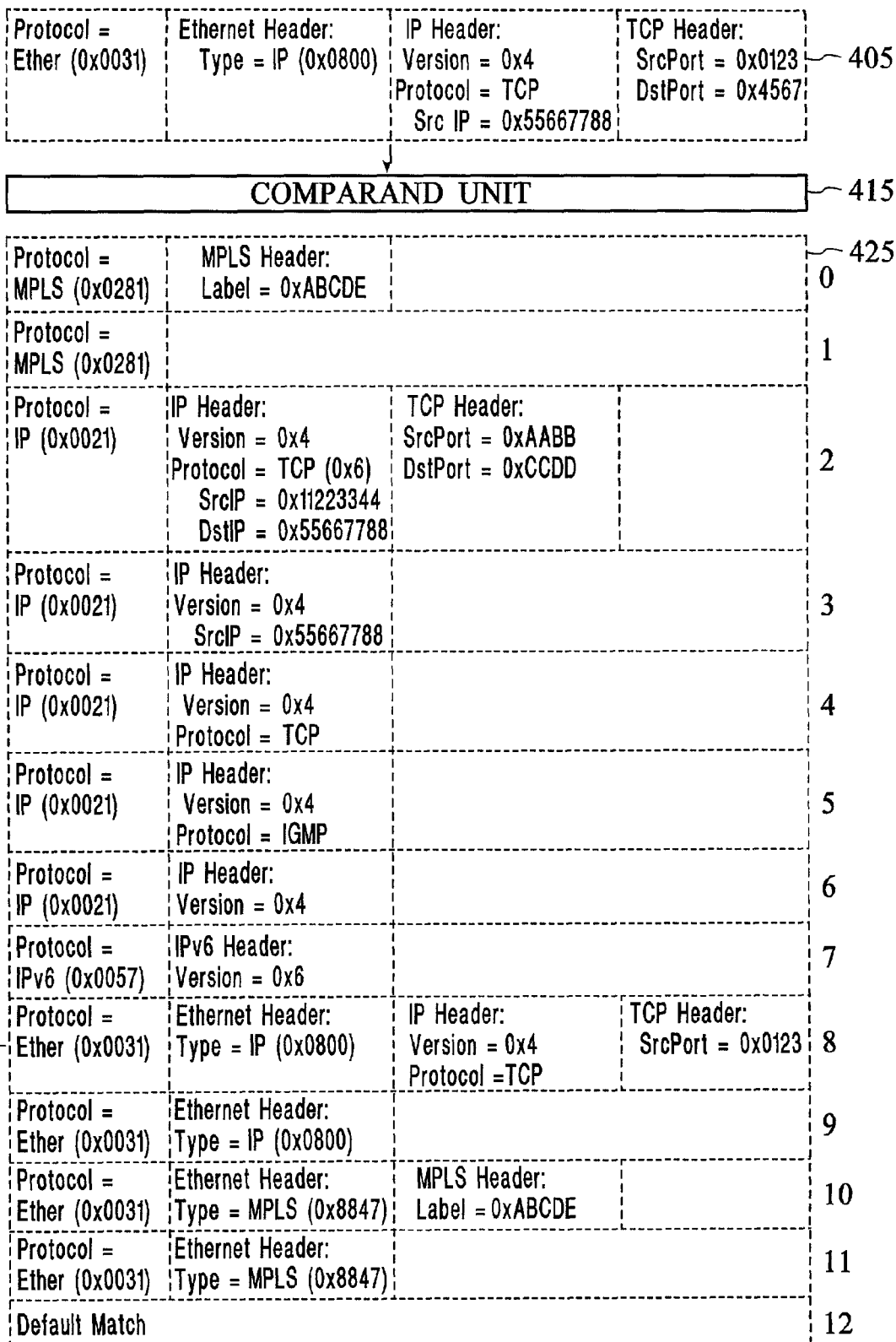
FIG. 4 depicts an example of a programmed CAM array 425 that identifies the fields of interest for multiple class-specific entries.

FIG. 4 depicts an example of a programmed CAM array 425 that identifies the fields of interest for multiple class-specific entries. The example of FIG. 4 also depicts a key field 405 and a comparand unit 415. In this example, unlike the embodiment of FIG. 3, which depicted a programmed CAM array at the bit level, here the programmed CAM array and the key field are depicted at the Protocol level. Also in this example, fields that are not identified in the corresponding protocol fields are considered to be masked (don't cares). Masking of fields enables class-specific entries to identify more generic (broad) classes of traffic.

In the programmed CAM array 425 depicted in FIG. 4, the far left field of each class-specific entry, which is labeled "Protocol", represents the protocol field of a PPP header (PPP protocol field). That is, in this example, the lowest Protocol of interest for all incoming traffic is assumed to be PPP. In the example programmed CAM array, the flag, address, and control fields within the PPP headers are assumed to be constant for all incoming packets. Therefore, the class-specific entries can be programmed without including the flag, address, and control fields, and the key field can be extracted with an offset that excludes the flag, address, and control fields of the PPP headers. In this example, the flag, address, and control fields can be disregarded because they do not provide any distinctive information. When the flag, address, and control fields of the PPP header are omitted, the PPP protocol field remains as the sole field of interest in the PPP header. The PPP protocol field identifies the protocol of the information in the payload, which provides a description of the PPP payload. For example, in class-specific entry #0, the payload is described as being formatted according to the Multi Protocol Label Switching (MPLS) protocol by the unique encoding of (0x0281) in the PPP protocol field.

In another embodiment, the lowest layer of all incoming traffic has a Protocol other than PPP, such as Generic Framing Procedure (GFP), Ethernet, or 802.3 (Institute of Electrical and Electronics Engineers (IEEE) 802.3 standard). In yet another embodiment, the lowest layer Protocol is not the same for all incoming traffic. In such a case where the lowest layer Protocol is not the same for all incoming traffic, it may not be appropriate to offset the key field or class-specific entries in the programmed CAM array, if doing so would sacrifice distinguishing bits.

The CAM array 425 is programmed with class-specific entries for incoming packets having various Protocols at different layers of the OSI model, such as Multi Protocol Label Switching (MPLS), Internet Protocol (IP), Internet Protocol Version Six (IPv6), Ethernet, and Transmission Control Protocol (TCP), and Internet Group Multicast Protocol (IGMP). The Protocols depicted in FIG. 4 are exemplary only. The techniques depicted in FIGS. 2-10 may be used in connection with packets of any packet format or Protocol.

In an embodiment, there may be multiple class-specific entries that mimic the same packet format. That is, within the same packet format, there are likely multiple entries that have different values within the fields of interest (i.e., specific IP addresses, MAC addresses, MPLS labels, Port numbers, etc.). Additionally, in an embodiment, within a programmed CAM array there may be a default entry, which matches any key field that does not match any other class-specific entries in the CAM array. For example, in the programmed CAM array depicted in FIG. 4, class-specific entry #12 is a default entry. In an embodiment, a default hit causes the corresponding packet to be classified in a default traffic class. In another embodiment, a default hit triggers another classification process, such as a software classification process.

In the example depicted in FIG. 4, traffic is classified at the network node using the key field and the programmed CAM array, in accordance with an embodiment of the invention. The key field 405 is extracted from an incoming packet according to the techniques described with reference to FIGS. 2-10. In an embodiment, after being extracted from an incoming packet, the key field is input into to the comparand unit 415. The key field is then compared to the class-specific entries in the programmed CAM array 425, according to the techniques described with reference to FIGS. 2-10. If a match is found, the associated data identifies the traffic class of the corresponding packet. In the example depicted in FIG. 4, a match is found for the key field 405 at class-specific entry #8. The match is indicated (as a "hit") to the left of class-specific entry #8. In the example of FIG. 4, class-specific entry #8 indicates that all of the fields in the IP header except the version field and the protocol field are masked and that all of the fields in the TCP header except the port field are masked. The comparand includes values for the masked fields although those values in the masked fields are not considered in the CAM array search.

Other examples of comparison of different key fields to class-specific entries in the programmed CAM array 425 may also be made. For example, if the key field has a format of PPP:MPLS (Label=0x01234), then the key field matches class-specific entry #1. In this example, there is a match because the mask of class-specific entry #1 does not care about the comparison of the "Label" field of the MPLS header, so class-specific entry #1 matches with any MPLS label.

In another example, the key field has a format of PPP:IP (Version=0x4, IP header protocol=IGMP, Src IP=0x55667788). The key field in this example matches class-specific entry #3 because the "Version" and "Src IP" fields match, and because the IP header protocol field is masked in class-specific entry #3 and therefore is of no concern. The key field also matches class-specific entry #5 because the "Version" and IP header protocol fields match, and because the "Src IP" field is masked in class-specific entry #5 and therefore is not compared. If the CAM array returns more than one match, then there must be some mechanism in place to identify the most desired match. Therefore, either class-specific entry #3 or class-specific entry #5 will be the only hit.

In yet another example, the key field has a format of PPP:Ethernet:IPv6. The key field in this example matches the default entry, class-specific entry #12. The key field did not match any of the earlier class-specific entries #1-11. Therefore, the default entry #12 operates as a matching entry, since no other class-specific entries matched the key field and the mask for entry #12 does not compare any fields.

In an embodiment, since each class-specific entry in the programmed CAM array has associated data in the form of a traffic class ID, when a match is found as indicated in the examples above, an associated traffic class ID is provided as output to be used for traffic classification.

Figure 5:
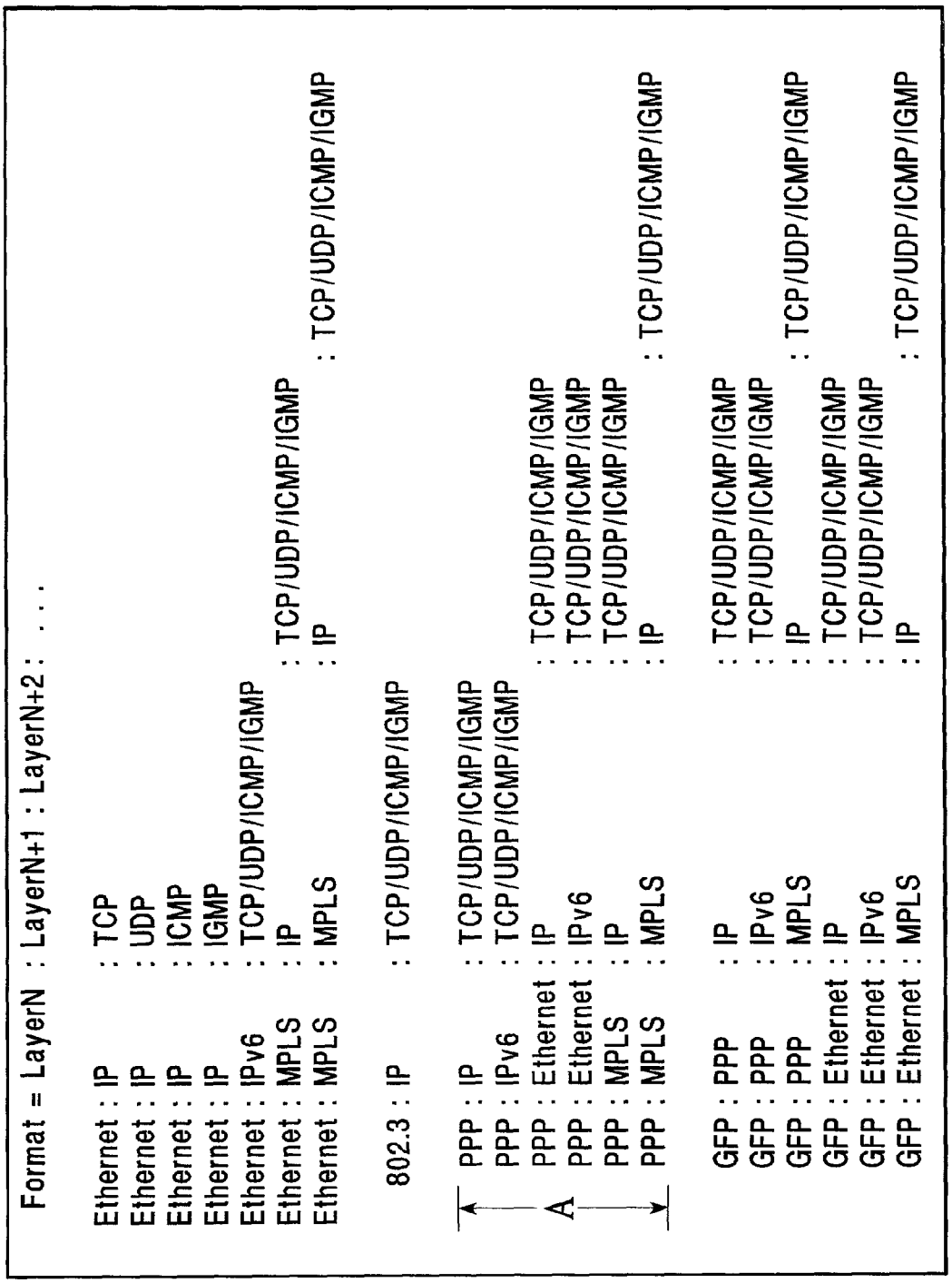
FIG. 5 depicts a table of common packet formats, suitable to be used in connection with an embodiment of the invention.

FIG. 5 depicts a table of common packet formats, suitable to be used in connection with an embodiment of the invention. In an embodiment where all of the packet formats listed in the table of FIG. 5 are programmed into a CAM array, it would be inappropriate to offset the key header and class-specific entries because the lowest layer Protocol is not the same in all cases. However, if only section "A", containing packet formats with PPP as the lowest layer Protocol, were present in the CAM array, then offsetting may be desirable.

Figure 6:
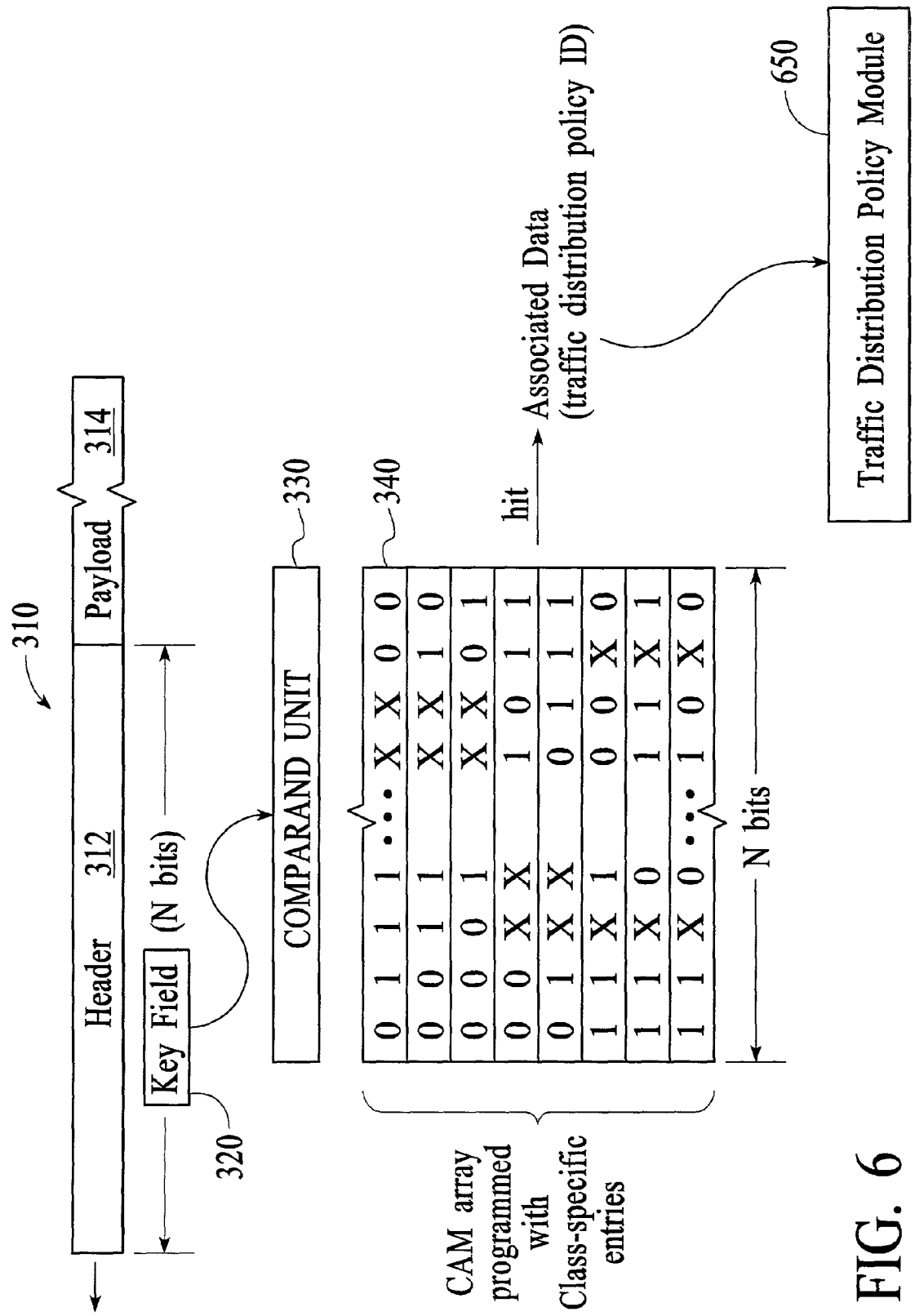
FIG. 6 depicts an embodiment of a technique for assigning a traffic distribution policy to traffic at a network node using a programmed CAM array and protocol-independent key field extraction, in accordance with an embodiment of the invention.

FIG. 6 depicts an embodiment of a technique for assigning a traffic distribution policy to traffic at a network node using a programmed CAM array and protocol-independent key field extraction, in accordance with an embodiment of the invention. In an embodiment, a traffic distribution policy indicates how packet traffic should be distributed among multiple different channels (i.e., ports, buses, queues, etc.). The depiction of FIG. 6 includes an incoming packet 310, a key field 320, a comparand unit 330, a CAM array 340 that is programmed as described above, and a traffic distribution policy module 650. In an embodiment, the CAM array is searched as described with reference to FIGS. 3-5, with the exception that the data that is associated with the class-specific entries is in the form of traffic distribution policy identifiers (traffic distribution policy IDs), rather than traffic class IDs. Therefore, the associated data that is output from the CAM array in response to a CAM array hit is a traffic distribution policy ID, rather than a traffic class ID. In the embodiment of FIG. 6, the traffic distribution policy ID related to a particular class-specific entry is an index value that identifies the location of the appropriate traffic distribution policy within the traffic distribution policy module 650. In an embodiment, the traffic distribution policies are stored within the traffic distribution policy module as traffic distribution policy entries. With reference to the embodiment depicted in FIG. 6, the output traffic distribution policy ID is forwarded to the traffic distribution policy module. The traffic distribution policy module has a memory for storing a group of traffic distribution policy entries. The traffic distribution policy IDs are used to locate the desired traffic distribution policy entries. When a desired traffic distribution policy entry is located in the memory, the traffic distribution policy is used to distribute the respective packet. In an embodiment, the traffic distribution policy module includes a static random access memory (SRAM) for storing the traffic distribution policy entries, although other memory devices may be utilized.

FIG. 7a depicts an example traffic distribution policy entry. In the embodiment of FIG. 7a, the traffic distribution policy entry includes multiple fields that together identify a policy for distributing incoming traffic. Included in the traffic distribution policy entry of FIG. 7a are the following fields: Select, Port, Priority, Offset0, Length0, OffsetM−1, and LengthM−1. The fields shown in FIG. 7a are exemplary only. Different fields for identifying a traffic distribution policy are also contemplated.

FIG. 7B depicts a table that elaborates on the contents of the information that is included in the fields of the example traffic distribution policy that is depicted in FIG. 7A. Referring to FIG. 7B, the "Select" field is a two bit field that identifies the type of traffic distribution algorithm that is to be used for the respective traffic class. The different traffic distribution algorithms include; round-robin, least utilized, fixed port number, and hashing using Offset-Length pairs. Thus, in the embodiment of FIG. 7B, each traffic distribution policy entry will be programmed to distribute traffic according to one of these four algorithms. For example, if "round-robin" is the specified algorithm, then the respective packet will be distributed on a round robin basis. If "least utilized" is selected then the packet will be sent out on the least utilized port. In an embodiment, the an embodiment the receive buffer is an RxFIFO buffer. An RxFIFO buffer is a receive buffer that operates on a "first in first out" basis. That is, the RxFIFO buffer retrieves the item stored for the longest time first. If "fixed port number" is selected then the packet will be sent out on a fixed port. The desired fixed port is identified by a two bit "Port" field. The "Port" field is a two bit field that identifies the port number to be used to direct the incoming packet if "fixed port number" is specified in the "Select" field. In an alternate embodiment, another type of fixed channel is specified instead of a fixed port, such as a bus or a queue. If "hashing" is selected then the packet will be distributed according to a hash function. In an embodiment, the fields to be hashed are identified using Offset-Length pairs which are defined below.

With reference to the table depicted in FIG. 7B, the "Priority" field is one (1) bit long and categorizes the traffic as having a high priority threshold or a low priority threshold at the receive buffer. In an embodiment, if the selected threshold is exceeded, then the packet can be discarded.

With reference to the table depicted in FIG. 7B, the "Offset0" field is six (6) bits long and specifies the starting byte for the first field (field 0) used in hashing. The "Length0" field is six (6) bits long and specifies the length, in bits, of the first field used in hashing. For example, Length0 may specify a continuous number of bits from the most significant, starting byte, Offset0.

With reference to the table depicted in FIG. 7B, the "OffsetM−1" field is six (6) bits long and specifies the starting byte for field M−1 used in hashing. The "LengthM−1" field is six (6) bits long and specifies the length, in bits, of field M−1 used in hashing. The combination of an "Offset" value and a "Length" value constitutes an Offset-Length pair to be used for hashing. In an embodiment, hashing is a process that uses an algorithm to convert a first value (i.e., an Offset-Length pair) into a second value (i.e., port number 1, 2, 3, or 4).

Figure 8:
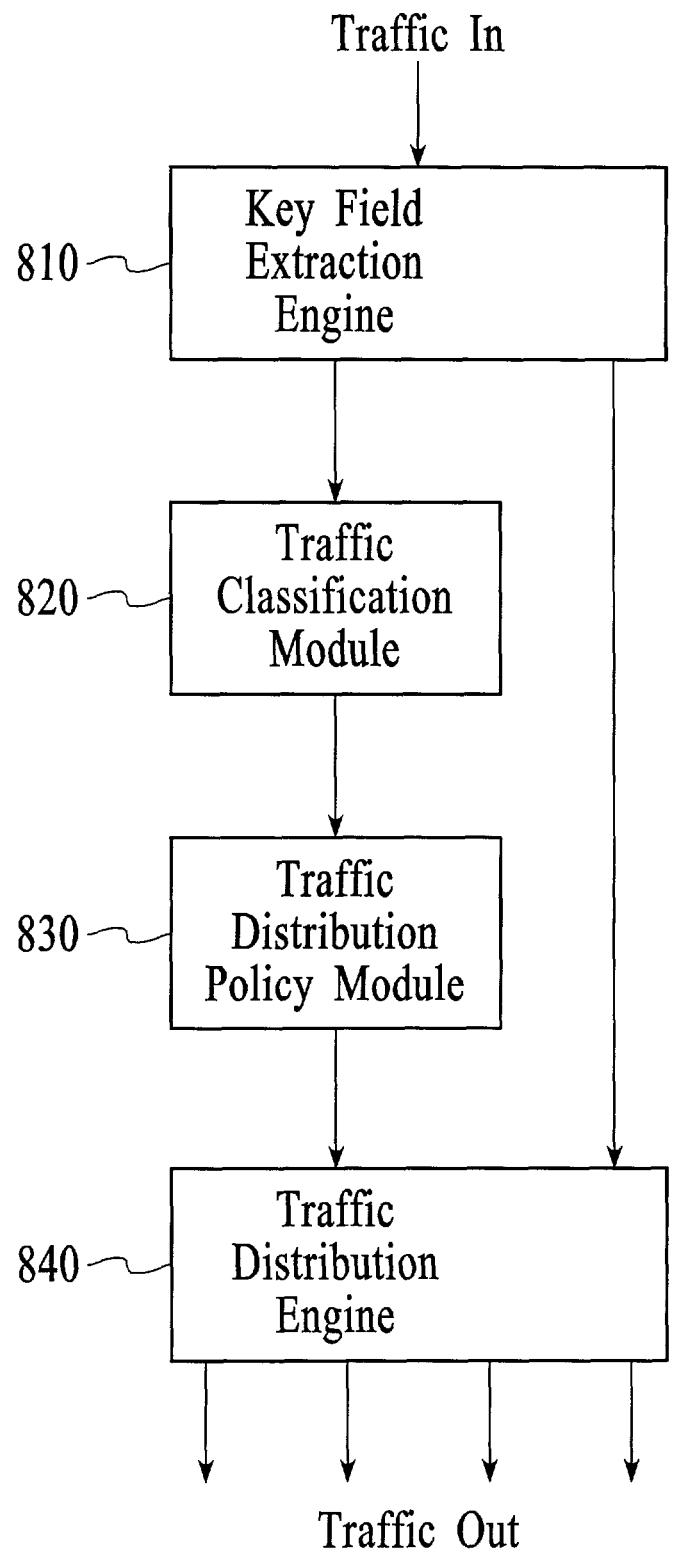
FIG. 8 depicts an embodiment of a system for distributing traffic at a network node according to an embodiment of the invention.

FIG. 8 depicts an embodiment of a system for distributing traffic at a network node according to an embodiment of the invention. In the embodiment of FIG. 8, the system includes a key field extraction engine 810, a traffic classification module 820, a traffic distribution policy module 830 and a traffic distribution engine 840. The system depicted in FIG. 8 functions to obtain a Protocol-independent key field from an incoming packet, classify the incoming packet based upon the Protocol-independent key field, determine a traffic distribution policy for the incoming packet based upon the classification of the incoming packet, and distribute the incoming packet over limited network resources by applying the determined traffic distribution policy. The depiction of the system of FIG. 8 is a logical depiction of how traffic is conveyed through the system.

The key field extraction engine is communicatively coupled to the traffic classification module and to the traffic distribution engine. The key field extraction engine receives inbound traffic in the form of a packet and may forward the packet to the traffic distribution engine. The key field extraction engine extracts (obtains) the key field from the packet. The key field is a continuous portion of the packet that is Protocol-independent. That is, the same portion of every incoming packet is extracted regardless of the Protocols in which the packet was formatted. In an embodiment, the key field is a first portion of the incoming packet. No parsing is required to extract the key field because the key field extraction engine does not have to locate specific fields within the packet. For example, the key field is simply the first portion of the packet, or a continuous portion of the packet having a standard offset.

The key field extraction engine passes the extracted key field to the traffic classification module. The traffic classification module includes a CAM array programmed with multiple class-specific entries as described above with reference to FIGS. 2-7. In an embodiment, the traffic classification module also includes a comparand unit for comparing the key field against the multiple class-specific entries in the CAM array. In an embodiment, the comparand unit receives the key field and compares it against the class-specific entries. When a match is found, a hit occurs and data associated with the matching class-specific entry is output. In an embodiment, a traffic distribution policy ID is output as the associated data and forwarded to the traffic distribution policy module. The traffic distribution policy ID is used by the traffic distribution policy module to identify a traffic distribution policy entry. The traffic distribution policy entry contains the specific algorithms and instructions needed to implement a particular traffic distribution policy. When the correct traffic distribution policy entry is located within the traffic distribution policy module, it is forwarded to the traffic distribution engine. The traffic distribution engine applies the traffic distribution policy enumerated in the received traffic distribution policy entry and uses it to forward the packet to the desired channel. In an embodiment, traffic entering the node through a high-speed interface may be distributed to multiple lower speed interfaces according to the applied traffic distribution policies. As indicated in the embodiment depicted in FIG. 8, the traffic enters the key field extraction engine through a single high-speed interface and is distributed by the traffic distribution engine to four lower speed interfaces (indicated by the four arrows). Distributing traffic from one high-speed interface to four lower speed interfaces is exemplary only. Other embodiments are also contemplated for distributing traffic across multiple channels.

Figure 9:
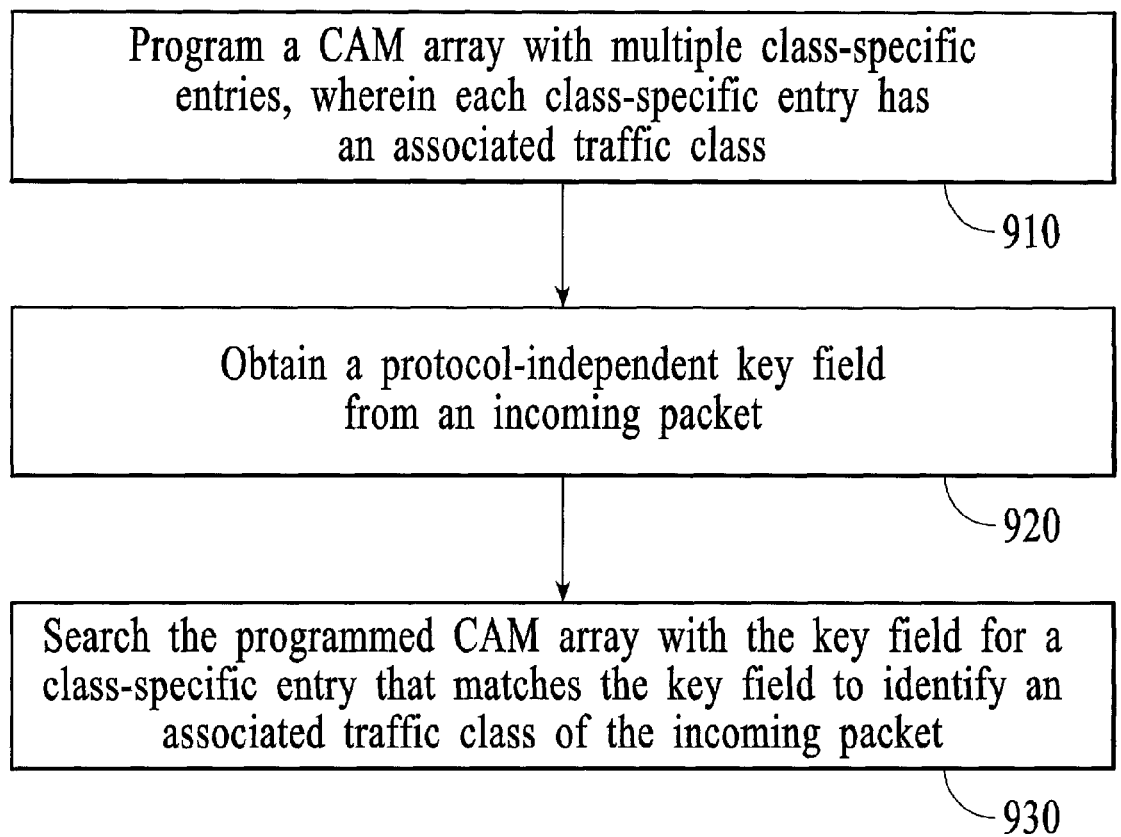
FIG. 9 is a flow diagram of a method for classifying traffic at a network node, according to an embodiment of the invention.

FIG. 9 is a flow diagram of a method for classifying traffic at a network node, according to an embodiment of the invention. At block 910, a CAM array is programmed with multiple class-specific entries, wherein each class-specific entry has an associated traffic class. At block 920, a Protocol-independent key field is obtained from an incoming packet. At block 930, the programmed CAM array is searched with the Protocol-independent key field for a class-specific entry that matches the Protocol-independent key field to identify an associated traffic class of the incoming packet.

Figure 10:
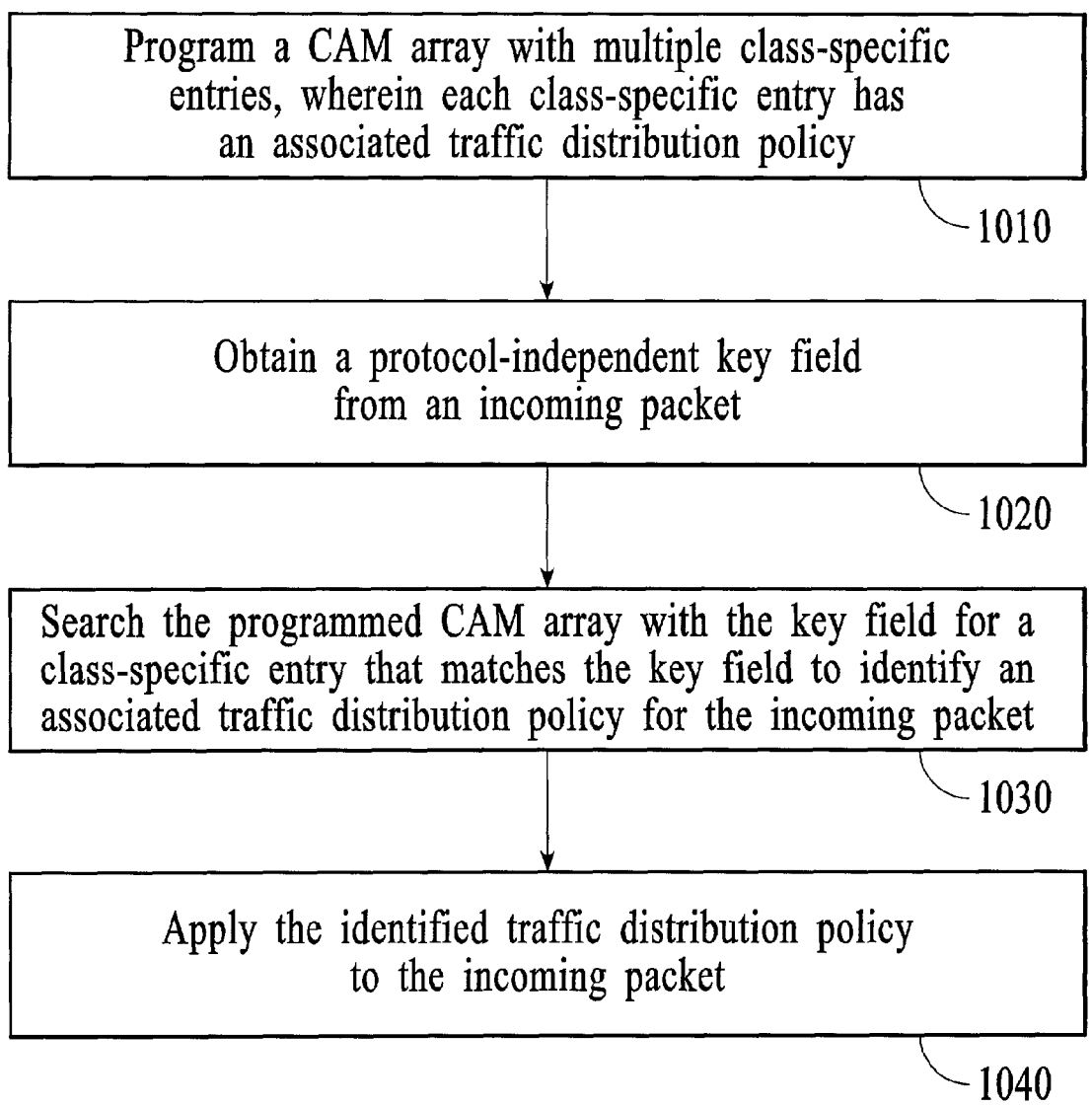
FIG. 10 is a flow diagram of a method for distributing traffic at a network node, according to an embodiment of the invention.
Figure 11:
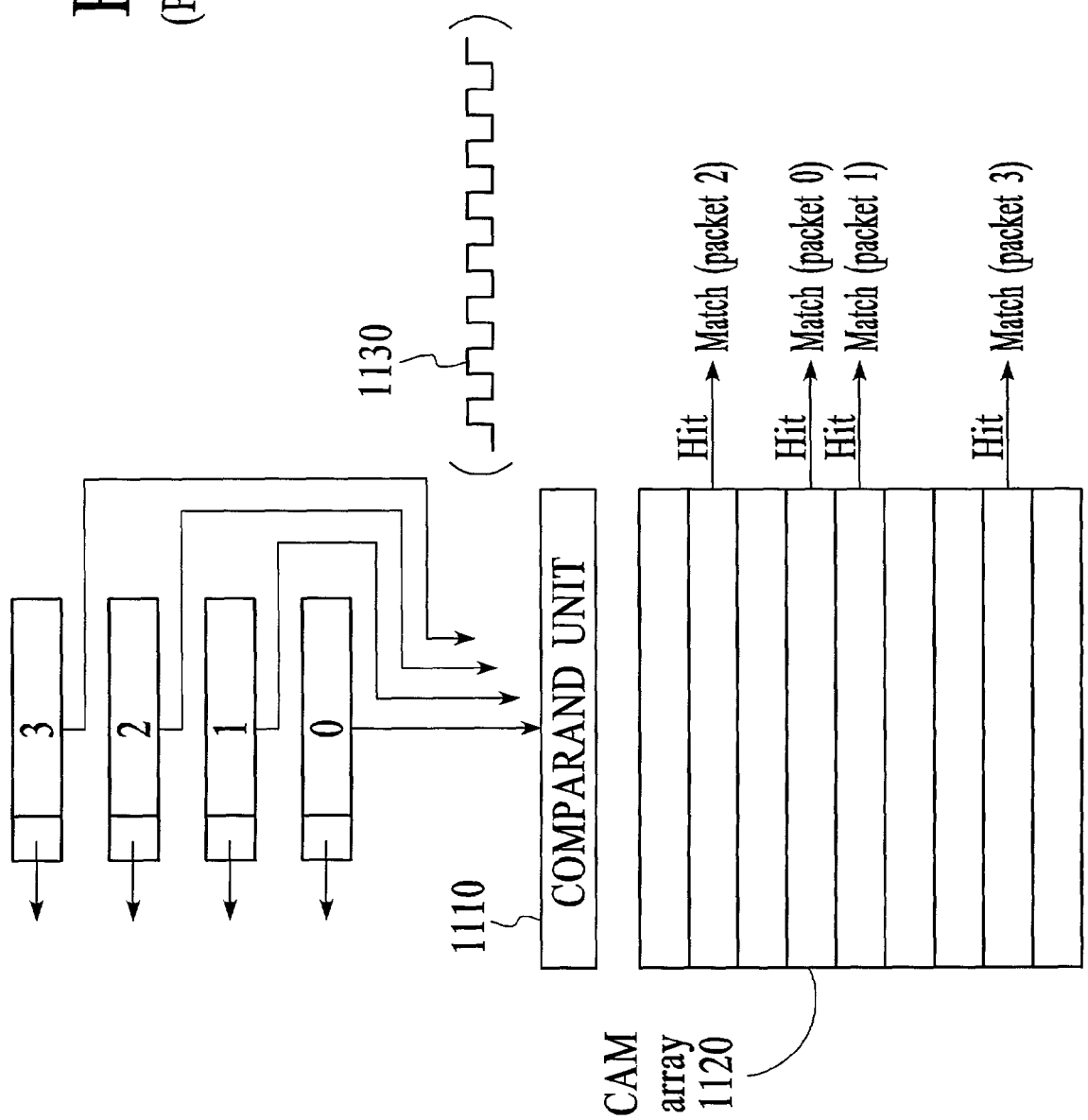
FIG. 11 depicts a prior art technique for classifying traffic at a network node.

FIG. 10 is a flow diagram of a method for distributing traffic at a network node, according to an embodiment of the invention. At block 1010, a CAM array is programmed with multiple class-specific entries, wherein each class-specific entry has an associated traffic distribution policy. At block 1020, a Protocol-independent key field is obtained from an incoming packet. At block 1030, the programmed CAM array is searched with the Protocol-independent key field for a class-specific entry that matches the key field to identify an associated traffic distribution policy for the incoming packet. At block 1040, the identified traffic distribution policy is applied to the incoming packet.

Figure 12:
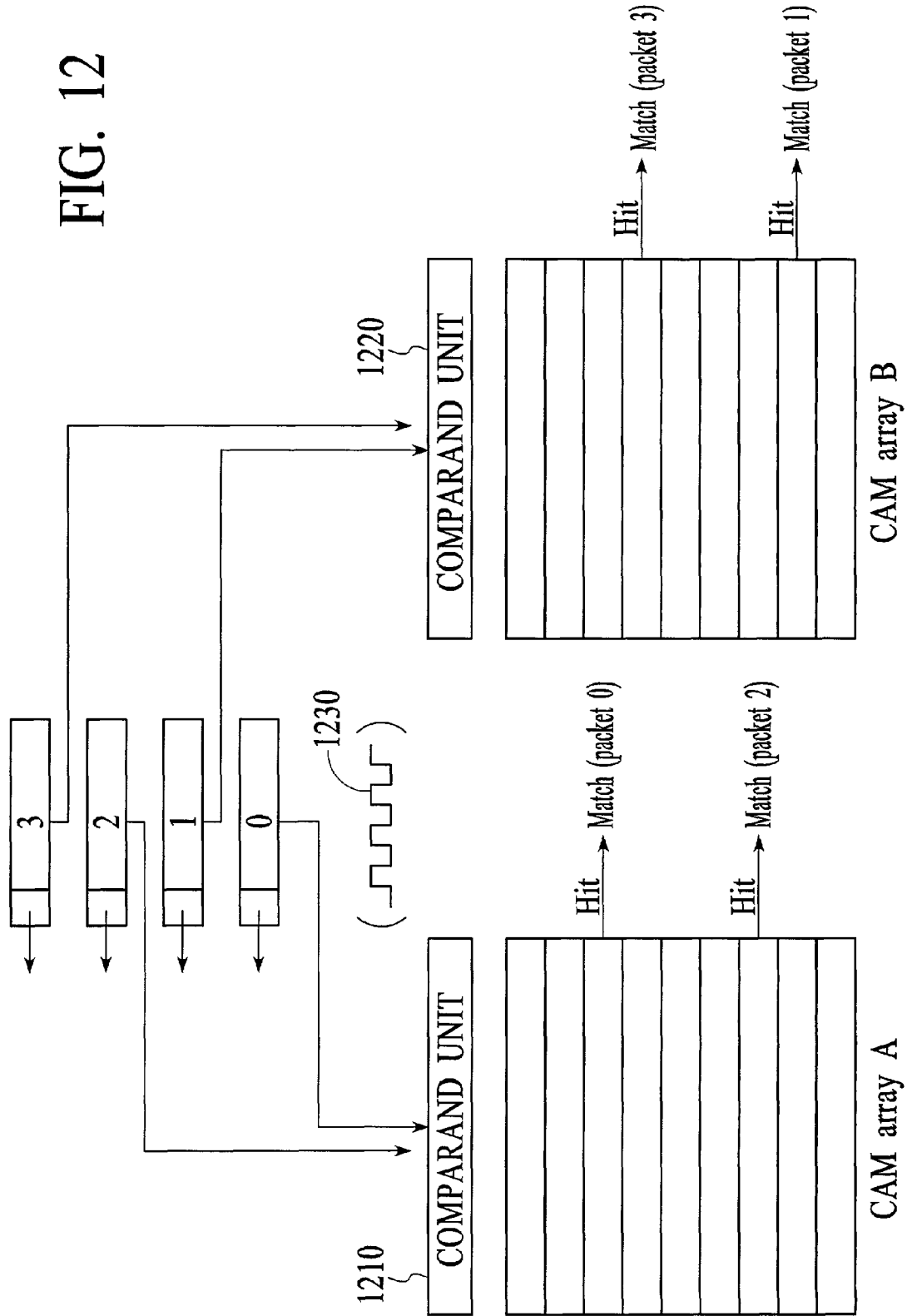
FIG. 12 depicts a search distribution technique that utilizes parallel CAM arrays, according to an embodiment of the invention.

FIG. 12 depicts an embodiment of a search distribution technique that utilizes parallel CAM arrays. In the embodiment depicted in FIG. 12, multiple CAM arrays are programmed with identical search entries and classification searches related to incoming packets are distributed among the multiple CAM arrays. The embodiment depicted in FIG. 12 includes incoming packets 0-3, comparand unit 1210, CAM array A, comparand unit 1220, CAM array B, and clock 1230. Although two CAM arrays are depicted in FIG. 12, the techniques described with reference to FIGS. 2-16 may be implemented with any number of CAM arrays.

In the embodiment depicted in FIG. 12, the multiple CAM arrays A and B are identically programmed. Because the CAM arrays are identically programmed, parallel searches may be performed using the two CAM arrays and the searches will yield the same search results as if only one CAM array was searched.

In the embodiment depicted in FIG. 12, classification searches are carried out using a key (not shown) that is identified from an incoming packet. In an embodiment, the key is parsed from the incoming packet. In another embodiment, the key is extracted using the techniques described above with reference to FIGS. 1-10. The key is input to a comparand which generates a comparand value that corresponds to the key. The comparand value is compared against the entries in a CAM array. The packet is classified in response to a match between the comparand value and an entry in the CAM array.

In the embodiment depicted in FIG. 12, classification searches related to packets 0-3 are distributed between CAM array A and CAM array B. Upon classification search distribution, CAM array A and CAM array B are searched in parallel for matches to a key related to each incoming packet. That is, one CAM array is used for one portion of the classification searches, while the other CAM array is used for the other portion of classification searches. For example, in the embodiment depicted in FIG. 12, classification searches related to packets 0 and 2 are processed by CAM array A, while classification searches related to packets 1 and 3 are processed by CAM array B. By processing classification searches using multiple CAM arrays in parallel, the overall speed of packet classification can be accelerated. The acceleration of the speed of packet classification is graphically depicted through the clock 1230 which indicates the passage of only four clock cycles to classify four packets, while the clock 1130 of prior art FIG. 11 indicates the passage of eight clock cycles to classify four packets.

In an embodiment, packets have a fixed order prior to classification search distribution. For example, the fixed order of the packets may be set by the order of arrival of the packets, the queue order of the packets, packet priority, or some other ordering mechanism. In the embodiment depicted in FIG. 12, assume the fixed order is represented by the packet numbers 0-3, with packet 0 being "first in line" and packet 3 being "last in line". In an embodiment, classification searches are distributed to CAM arrays on an alternating basis with respect to the fixed order, i.e. alternating between or among CAM arrays on each clock cycle. For example, in the embodiment depicted in FIG. 12, a classification search related to packet 0 is distributed to CAM array A, a classification search related to packet 1 is distributed to CAM array B, a classification search related to packet 2 is distributed to CAM array A, and a classification search related to packet 3 is distributed to CAM array B. Distributing classification searches on an alternating basis is exemplary only. Other techniques for distributing classification searches are also contemplated.

Figure 13A:
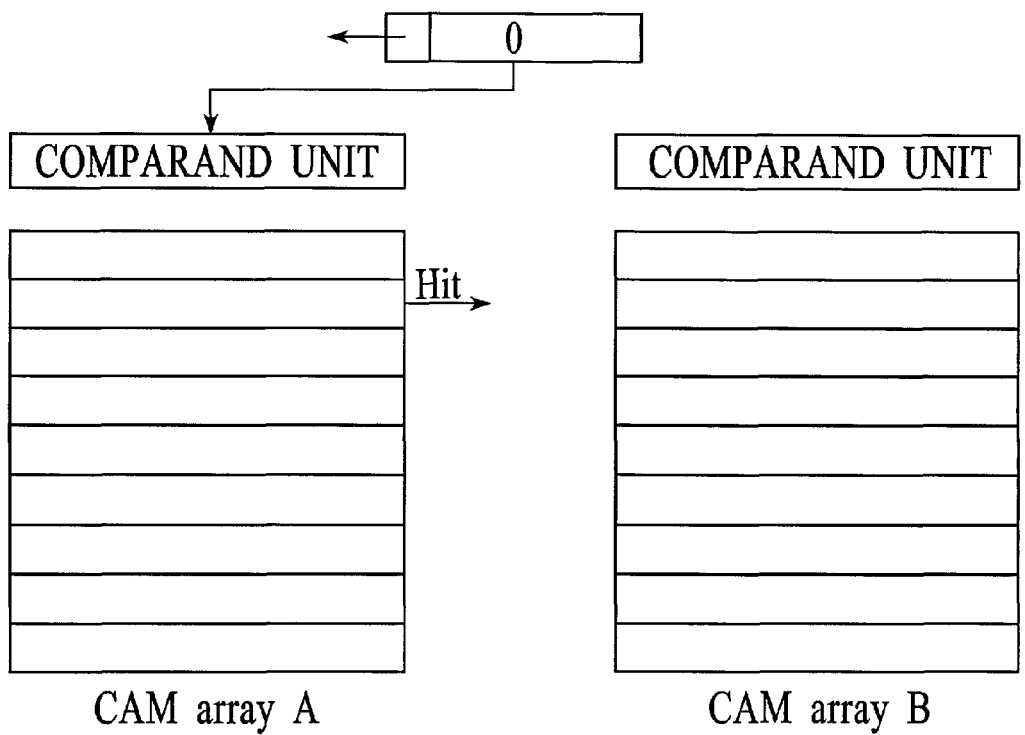
FIGS. 13A-13D depict an expansion of the classification search distribution technique described with reference to FIG. 12, according to an embodiment of the invention.
Figure 13B:
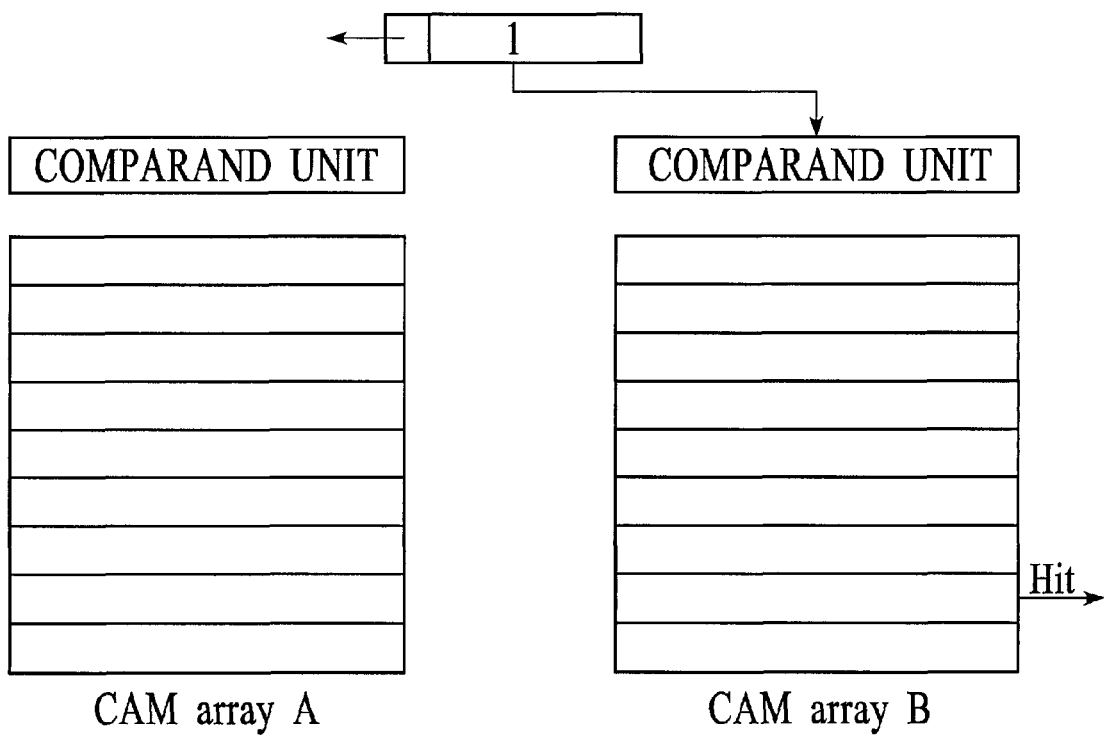
Figure 13C:
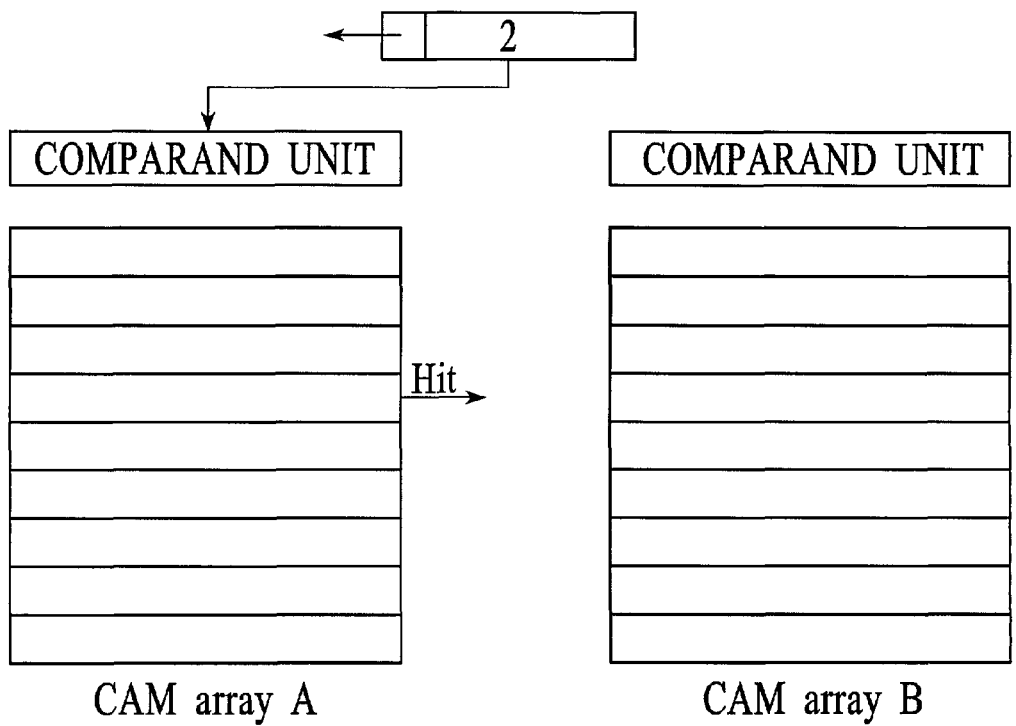
Figure 13D:
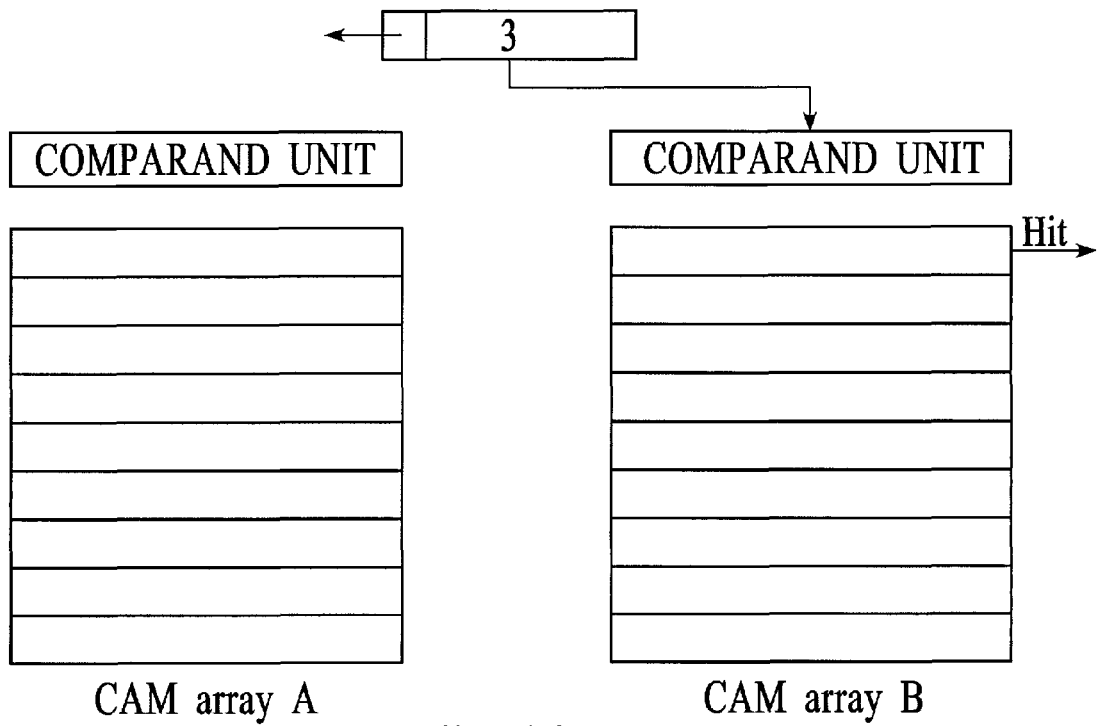

FIGS. 13A-13D depict an expansion of the classification search distribution technique described with reference to FIG. 12. FIG. 13A depicts a classification search related to packet 0 being distributed to CAM array A and a hit occurring in CAM array A. FIG. 13B depicts a classification search related to packet 1 being distributed to CAM array B and a hit occurring in CAM array B. FIG. 13C depicts a classification search related to packet 2 being distributed to CAM array A and a hit occurring in CAM array A. FIG. 13D depicts a classification search related to packet 3 being distributed to CAM array B and a hit occurring in CAM array B.

FIG. 14 is a table showing an example of how classification searches are distributed between two CAM arrays as a function of clock cycle, according to an embodiment of the invention. In the embodiment depicted in FIG. 14, classification searches are distributed to CAM array A and CAM array B in an alternating fashion. In the table depicted in FIG. 14, "start search" means that the related key has been distributed to the designated CAM array and the search of the designated CAM array using the related key has begun. For example, "key 0 start search", depicted in FIG. 14, indicates that key 0 has been distributed to CAM array A and the search of CAM array A using key 0 has begun. In the table depicted in FIG. 14, "end search" means that the search of the designated CAM array using the related key is complete and a classification search result has been output. For example, "key 0 end search", depicted in FIG. 14, indicates that the search of CAM array A using key 0 is complete and a classification search result related to key 0 has been output.

In the embodiment depicted in FIG. 14, the searches of the two CAM arrays are performed in a staggered fashion such that, at each clock cycle (except for clock cycle 0), a first classification search begins in a first CAM array and a second classification search ends in a second CAM array. By staggering the searches, the combined throughput of the two CAM arrays averages out to one packet per cycle. For example, in the embodiment depicted in FIG. 14, at clock cycle 2 a search of CAM array A using key 2 begins, and a search of CAM array B using key 1 ends. At clock cycle 3, the search of CAM array A using key 2 ends and a new search of CAM array B using key 3 begins. A similar staggering or alternation can be applied if the number of CAM arrays is greater than two.

Figure 15:
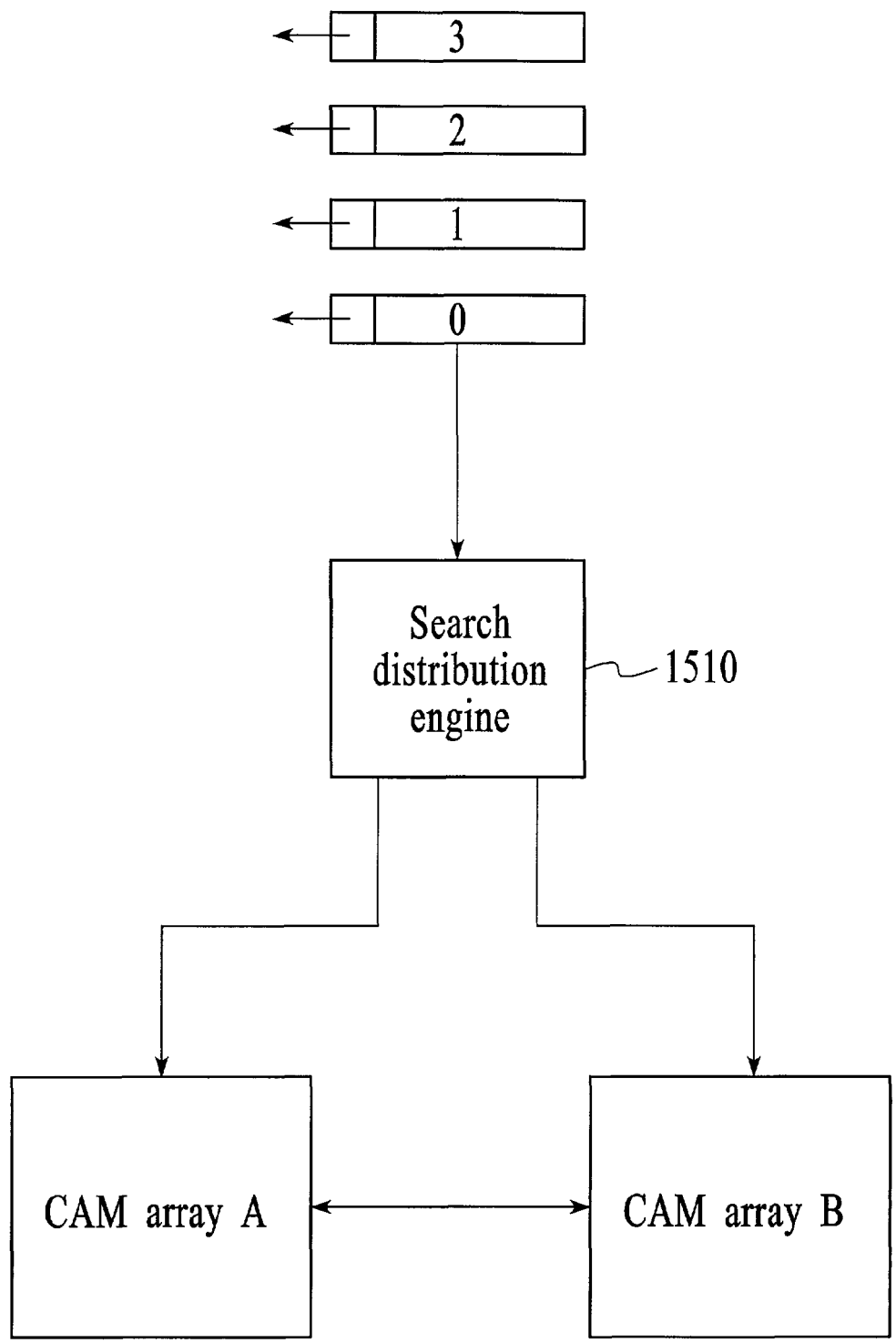
FIG. 15 depicts an embodiment of a system for distributing classification searches at a network node, according to an embodiment of the invention.

FIG. 15 depicts an embodiment of a system for distributing classification searches at a network node. In the embodiment, classification searches are distributed among multiple, identically programmed CAM arrays. In the embodiment depicted in FIG. 15, the system includes incoming packets 0-3, a search distribution engine 1510, a first CAM array (CAM array A), and a second CAM array (CAM array B). Packets 0-3 arrive at the network node and keys relating to each of the packets 0-3 are identified and forwarded to the search distribution engine. The search distribution engine determines to which CAM array each key should be sent. That is, the search distribution engine determines which CAM array should be used for each classification search. After determining which CAM array should be used for a particular classification search, the search distribution engine forwards a classification search request (including the respective key) to the proper CAM array. In an embodiment, the search distribution engine is a toggle switch. In an embodiment, the search distribution engine is a 1-bit toggle switch that alternates between 0 and 1 for distributing classification searches between two CAM arrays. In another embodiment, the search distribution engine is a 2-bit toggle switch that distributes classification searches among four CAM arrays.

In an embodiment, a classification search request is received at a CAM array. In the embodiment of FIG. 15, a classification search request is received at CAM array A or CAM array B. CAM array A and CAM array B are identically programmed. In an embodiment, the programming of CAM array A and CAM array B is kept in synchronization, as indicated by the horizontal double arrow between CAM array A and CAM array B. In an embodiment, the number of CAM arrays is variable. That is, there may be more than two CAM arrays operating in the system, i.e. there may be N CAM arrays in the system, where N is an integer greater than one. In a system having N CAM arrays, the search distribution engine can distribute classification searches among all N CAM arrays.

In an embodiment, upon receiving a classification search request at a particular CAM array, the classification search is performed in the CAM array.

Figure 16:
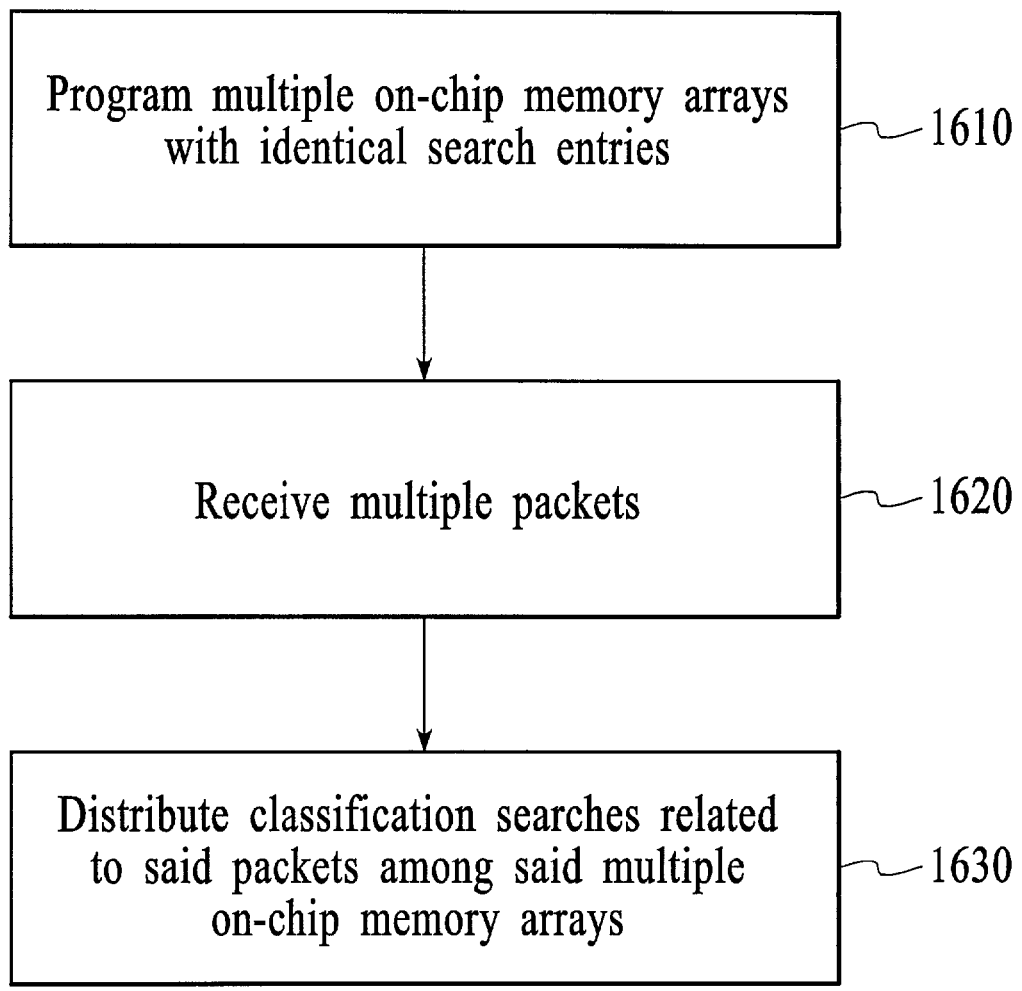
FIG. 16 is a flow diagram of a method for classifying network traffic at a network node according to an embodiment of the invention.

FIG. 16 is a flow diagram of a method for classifying network traffic at a network node according to an embodiment of the invention. At block 1610, multiple on-chip memory arrays are programmed with identical search entries. At block 1620, multiple packets are received. At block 1630, classification searches related to the packets are distributed among the multiple on-chip memory arrays.

Although search distribution techniques involving CAM arrays are depicted and described with reference to FIGS. 2-16, the techniques may be implemented using other types of on-chip memory, such as random access memory (RAM). On-chip memory is memory contained on the same chip as the logic that utilizes the memory. On-chip memory is distinct from off-chip memory in which the memory is located on a separate chip from the logic.

It shall be appreciated that not all methods steps described must be performed, nor must they be performed in the order stated.

Although specific embodiments of the invention have been described and illustrated, the invention is not to be limited to the specific forms or arrangements of parts as described and illustrated herein. The invention is limited only by the claims.

What is claimed is:

1. A method of classifying traffic at a network node comprising:
   programming multiple on-chip memory arrays with identical search entries, wherein the multiple on-chip memory arrays are identically programmed with search entries of a first on-chip memory array of the multiple on-chip memory arrays identical to search entries of a second on-chip memory array of the multiple on-chip memory arrays;
   receiving multiple packets; and
   distributing classification searches related to said packets among said multiple programmed on-chip memory arrays during simultaneous operation of all of said identically programmed on-chip memory arrays;
   wherein said multiple packets have a fixed order prior to said distributing of classification searches related to said packets, and wherein said distributing of classification searches related to said packets is performed according to said fixed order in an alternating fashion with respect to said fixed order.

2. The method of claim 1 wherein said distributing of classification searches related to said packets alternates at each clock cycle.

3. The method of claim 1 wherein the number of said multiple programmed on-chip memory arrays is two.

4. The method of claim 1 wherein the multiple on-chip memory arrays are of a same type.

5. A method of classifying traffic at a network node comprising:
   programming multiple content addressable memory (CAM) arrays with identical search entries, wherein the multiple CAM arrays are identically programmed with search entries of a first CAM array of the multiple CAM arrays identical to search entries of a second CAM array of the multiple CAM arrays, wherein said search entries are class-specific entries, each of said class-specific entries having an associated traffic distribution policy;
   receiving multiple packets;
   distributing classification searches related to said packets among said multiple programmed CAM arrays during simultaneous operation of all of said identically programmed CAM arrays;
   obtaining a protocol-independent key field from a packet of the multiple packets;
   searching one of said multiple programmed CAM arrays with said protocol-independent key field for a class-specific entry that matches said protocol-independent key field to identify an associated traffic distribution policy for said packet; and
   applying said identified traffic distribution policy to said packet.

6. The method of claim 5 wherein said multiple packets have a fixed order prior to said distributing of classification searches related to said packets, and wherein said distributing of classification searches related to said packets is performed according to said fixed order.

7. The method of claim 6 wherein said distributing of classification searches related to said packets is performed in an alternating fashion with respect to said fixed order.

8. The method of claim 7 wherein said distributing of classification searches related to said packets alternates at each clock cycle.

9. The method of claim 5 wherein the number of said multiple programmed CAM arrays is two.

10. The method of claim 5 wherein each of said class-specific entries has an associated traffic class, and wherein the method further comprises:
    searching one of said multiple programmed CAM arrays with said protocol-independent key field for the class-specific entry that matches said protocol-independent key field to identify an associated traffic class of said packet.

11. A system for classifying traffic at a network node comprising:
    a plurality of on-chip memory arrays configured to be programmed identically with search entries of a first on-chip memory array of the plurality of on-chip memory arrays identical to search entries of a second on-chip memory array of the plurality of on-chip memory arrays; and
    a search distribution engine configured to distribute a plurality of classification searches related to a plurality of incoming packets among said plurality of on-chip memory arrays during simultaneous operation of all of said identically programmed on-chip memory arrays, wherein said search distribution engine is further configured to distribute said classification searches in an alternating fashion to said plurality of on-chip memory arrays.

12. The system of claim 11 wherein the multiple on-chip memory arrays are of a same type.

13. A system for classifying traffic at a network node comprising:
- a plurality of content addressable memory (CAM) arrays configured to be programmed identically with search entries of a first CAM array of the plurality of CAM arrays identical to search entries of a second CAM array of the plurality of CAM arrays, wherein said CAM arrays are configured to be programmed identically with multiple class-specific entries, each of said class-specific entries having an associated traffic distribution policy;
- a search distribution engine configured to distribute a plurality of classification searches related to a plurality of incoming packets among said plurality of CAM arrays during simultaneous operation of all of said identically programmed CAM arrays;
- a key field extraction engine configured to obtain a protocol-independent key field from an incoming packet of said plurality of incoming packets;
- a traffic classification module configured to search one of said CAM arrays with said protocol-independent key field to identify an associated traffic distribution policy for said incoming packet; and
- a traffic distribution engine configured to apply said identified traffic distribution policy to said incoming packet.

14. The system of claim 13 wherein said search distribution engine distributes said classification searches in an alternating fashion to said plurality of CAM arrays.

15. The system of claim 13 wherein each of said class-specific entries has an associated traffic class, and
wherein the traffic classification module is further configured to search one of said CAM arrays with said protocol-independent key field to identify an associated traffic class of said incoming packet.

* * * * *